United States Patent [19]

Fujisawa et al.

[11] Patent Number: 5,367,422
[45] Date of Patent: Nov. 22, 1994

[54] DISC CARTRIDGE HAVING MISTAKEN RECORDING INHIBITING MECHANISM

[75] Inventors: Hirotoshi Fujisawa, Tokyo; Kenji Takahashi, Miyagi, both of Japan

[73] Assignee: Sony Corporation, Tokyo, Japan

[21] Appl. No.: 943,790

[22] Filed: Sep. 9, 1992

[30] Foreign Application Priority Data

Sep. 17, 1991 [JP] Japan ................................. 3-265178
Sep. 30, 1991 [JP] Japan ................................. 3-278630

[51] Int. Cl.$^5$ ...................... G11B 15/16; G11B 19/04; G11B 23/03
[52] U.S. Cl. .................................... 360/133; 360/60
[58] Field of Search ........................... 360/133, 60, 128

[56] References Cited

U.S. PATENT DOCUMENTS

| | | | |
|---|---|---|---|
| 4,796,138 | 1/1989 | Ono ........................ | 360/133 |
| 4,860,127 | 8/1989 | Takahashi et al. ................ | 360/60 |
| 4,918,559 | 4/1990 | Maruyama et al. ................ | 360/133 |
| 5,040,167 | 8/1991 | Tanaka et al. ................ | 360/133 |
| 5,041,923 | 8/1991 | Iwata et al. ................ | 360/60 |
| 5,087,998 | 2/1992 | Oishi ........................ | 360/60 |
| 5,121,279 | 6/1992 | Saeki et al. ................ | 360/133 |
| 5,150,269 | 9/1992 | Iwaki et al. ................ | 360/133 |

FOREIGN PATENT DOCUMENTS 0206897   6/1986  European Pat. Off. .
0206897A2 12/1986 European Pat. Off. .
0472443A1  8/1991 European Pat. Off. .

*Primary Examiner*—Stuart S. Levy
*Assistant Examiner*—David L. Ometz
*Attorney, Agent, or Firm*—Limbach & Limbach

[57] ABSTRACT

There is disclosed a mistaken recording inhibiting mechanism employed in a disc cartridge accommodating a disc which permits re-recording of information signals. This mistaken recording inhibiting mechanism comprises a mistaken recording inhibiting member having a pair of resilient arms extended from a closure part and a movement actuating part formed as one with said closure part, said movement actuating part partially facing an aperture formed in a cartridge main body and being adapted for actuating said closure part into movement: from outside the cartridge main body, a slide guide provided within said cartridge main body for guiding said resilient arms of said mistaken recording inhibiting member, and engaging means adapted for being engaged with one of said resilent arms of said mistaken recording inhibiting member and said slide guide. Thus, said mistaken recording inhibiting member may be moved in a stable condition and be fixedly held in a position where recording of information signals and inhibiting mistaken recording may be accomplished.

8 Claims, 14 Drawing Sheets

DISC CARTRIDGE HAVING MISTAKEN RECORDING INHIBITING MECHANISM

BACKGROUND OF THE INVENTION

1. Field of the Invention

This invention relates to a mistaken recording inhibiting mechanism for a disc cartridge accommodating a disc capable of re-recording information signals, such as a magneto-optical disc.

2. Description of the Prior Art

The prior art reveals, such as a magnetic disc or a magneto-optical disc, in which information signals once recorded thereon may be erased to permit, recording of new information signals.

The prior art also reveals disc cartridge accommodating a disc of this type which is provided with a mistaken recording inhibiting mechanism for preventing inadvertent erasure of information signals recorded on the disc.

It is possible with the mistaken recording inhibiting mechanism to make a selection between a state permitting re-recording of information signals and a state inhibiting erasure of the information signals already recorded on the disc.

FIG. 1 shows a typical arrangement of a mistaken recording inhibiting mechanism for a disc cartridge which is adapted for making a selection between the re-recordable state and the mistaken recording inhibiting state.

The mistaken recording inhibiting mechanism includes mistaken recording inhibiting member 3 which is movably mounted on a lower half 1 of the cartridge main body for opening or closing a detection hole 2 bored at a corner of the lower half 1.

The mistaken recording inhibiting member 3 is formed by molding synthetic resin. The mistaken recording inhibiting member 3 has a closure web 4 of a size large enough to close the detecting hole 2 bored in the lower half 1 and the first and second resilient arms 5, 6. The first and second resilient arms 5, 6 extend from both ends of the closure web 4 and face each other.

A slide guide 7 for guiding the sliding direction of the mistaken recording inhibiting member 3 is formed upright on the inner surface of the lower half 1. This slide guide 7 is formed substantially parallel to an upright peripheral wall 8 of the lower half 1 constituting the outer wall on the rear side of the cartridge main body.

The surface of the slide guide 7 opposite to the upright peripheral wall 8 is formed with first and second engaging recesses 10, 11 adapted for to engage a retention bead 9 formed on an outer lateral surface of the distal end of one of the resilient arms 5, 6 of the mistaken recording inhibiting member 3. These first and second engaging recesses 10, 11 are formed at such positions that the retention beads 9, 12 may be engaged with the slide guide 7 at positions in which the detecting hole 2 is closed and open, respectively.

The upright peripheral wall 8, formed as part of the lower half 1, has an opening 13 for exposing a retention bead 12 formed on the outer lateral surface of the distal end of the other resilient arm 6 of the mistaken recording inhibiting member 3. This retention bead 112 is accessible from outside of the cartridge main body. The opening 13 long enough to permit the mistaken recording inhibiting member 3 to be moved between a position of closing the detection hole 2 and the position of opening the detection hole 2.

A barrier wall 14 is formed upright within the lower half 1 and faces the opening 13.

Referring to FIG. 2, the mistaken recording inhibiting member 3 is placed within the lower half 1, with the closure web 4 positioned facing the detecting hole 2 and with the resilient arms 5, 7 extending between the slide guide 7 and the upstanding peripheral wall 8.

Meanwhile, a width $W_1$ between the outer lateral surfaces of the retention beads 9, 12 is selected to be wider than a distance $W_2$ between the slide guide 7 and the upstanding peripheral wall 8, so that, when the resilient arms 5, 6 are extended between the slide guide 7 and the upstanding peripheral wall 8, the resilient arms 5, 6 are resiliently deflected in a direction towards each other being pressed against the slide guide 7 and the upstanding peripheral wall 8.

The retention bead 12 formed on the other resilient arm 6 of the mistaken recording inhibiting member 3 provided within the lower half 1 is exposed to outside the cartridge main body.

By sliding the retention bead 12 formed on the other resilient arm 6 exposed to outside of the cartridge main body via opening 13, the mistaken recording inhibiting member 3 mounted within the lower half 1 can be moved in a direction shown by an arrow A and an arrow B in FIG. 2, with the resilient arms 5, 6 being guided by the slide guide 7 and the upstanding peripheral wall 8.

When the closure web 4 of the mistaken recording inhibiting member 3 is at the position closing the detecting hole 2, as shown in FIG. 2, the retention bead 9 on the resilient arm 5 is engaged in the first engaging recess 10 for maintaining the detecting hole 2 in the closed state. The mistaken recording inhibiting member 3 can be moved in the direction shown by an arrow A in FIG. 2 until the closure web 4 reaches the position of opening the detecting hole 2, the retention bead 9 is then engaged with the second engaging recess 11, as shown in FIG. 3, for maintaining the detecting hole 2 in the opened state.

Meanwhile, the mistaken recording inhibiting member 3 of the mistaken recording inhibiting mechanism is kept place within the lower half 1 by having the resilient arms 5, 6 resiliently deflected be being pressed against the slide guide 7 and the upstanding peripheral wall 8, so that, unless the width $W_1$ between the resilient arms 5, 6 is within a certain range, the mistaken recording inhibiting member 3 becomes unable to function properly if the width $W_1$ between the resilient arms 5, 6 is less than the distance $W_2$ by too much, then the mistaken recording inhibiting member becomes unable to be supported between the slide guide 7 and the upstanding peripheral wall 8. The result is that the mistaken recording inhibiting member 3 is liable to be detached from the cartridge main body.

On the other hand, if the width $W_1$ is too much greater than $W_2$, then the retention bead 9 becomes difficult to engage and disengage from the first and second engaging recesses 10, 11. When This occurs the detecting hole 2 cannot be easily opened or closed reliably and hence the recordable or unrecordable state for information signals cannot be set reliably.

If the mistaken recording inhibiting member 3 is produced by molding synthetic resin, it is difficult to maintain the high dimensional accuracy of the resilient arms 5, 6, necessary to avoid the above-mentioned problems. The resilient arms 5, 6 should extend from one ends of the closure web 4 with a somewhat precise spacing between them, however the resilient arms 5, 6 tend to be deflected towards each other such that the gap between therebetween narrows. This is one of the reasons the above-mentioned problems tends to occur.

OBJECT AND SUMMARY OF THE INVENTION

It is therefore an object of the present invention to provide a mistaken recording inhibiting mechanism for a disc cartridge whereby, even when the mistaken recording inhibiting member is molded from synthetic resin, the mistaken recording inhibiting member may be reliably held in position within the cartridge main body to prevent the mistaken recording inhibiting member from being detached during and after assembling of the disc cartridge as well as to permit the recordable and unrecordable states to be easily set.

For accomplishing the above-mentioned object, the present invention provides a mistaken recording inhibiting mechanism for a disc cartridge comprising a mistaken recording inhibiting member having a pair of resilient arms extended from a closure part, and a movement actuating part formed as part of the part. The movement actuating part, at least partially, faces an aperture formed in a cartridge main body. The aperture is adapted for actuating the closure part into movement from outside the cartridge main body. A slide guide is provided within the cartridge main body for guiding the resilient arms of the mistaken recording inhibiting member. Engaging means adapted for being engaged with at least one of the resilient arms of the mistaken recording inhibiting member are also provided.

The mistaken recording inhibiting member of the mistaken recording inhibiting mechanism of the disc cartridge according to the present invention is actuated into movement from outside the cartridge main body via a movement actuating part at least partially exposed via a notch formed in the cartridge main body. A pair of resilient arms extended from the mistaken recording inhibiting member is guided by a slide guide provided in the cartridge main body during movement of the mistaken recording inhibiting member.

The mistaken recording inhibiting member is maintained in the positions of closing and opening the mistaken recording detection hole formed in the cartridge main body by engaging means provided on at least one of the resilient arms and by a slide guide.

The mistaken recording inhibiting member is adapted for clamping the slide guide by the resilient arms.

DETAILED DESCRIPTION OF THE DRAWINGS

Figure 1:
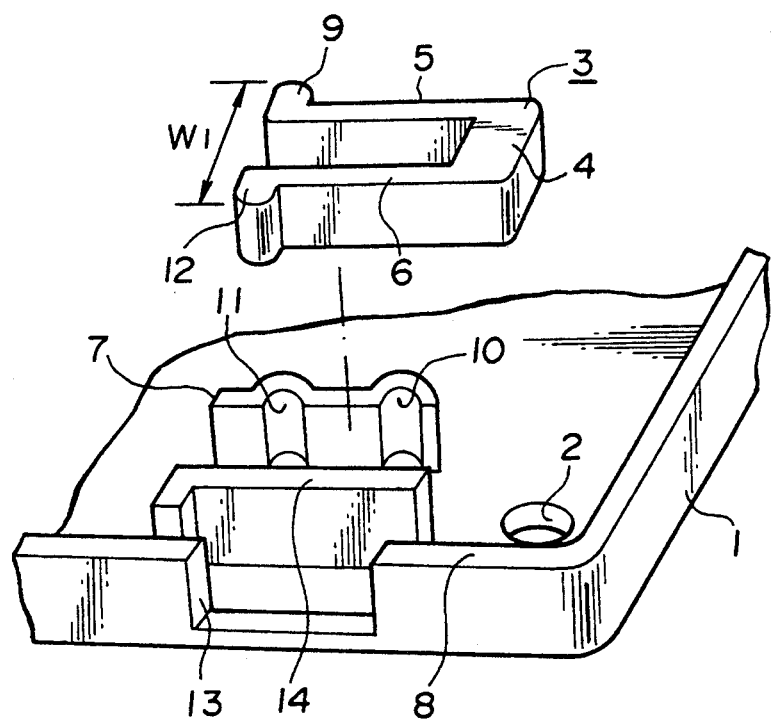
FIG. 1 is an exploded perspective view showing a conventional mistaken recording inhibiting mechanism for a disc cartridge.
Figure 2:
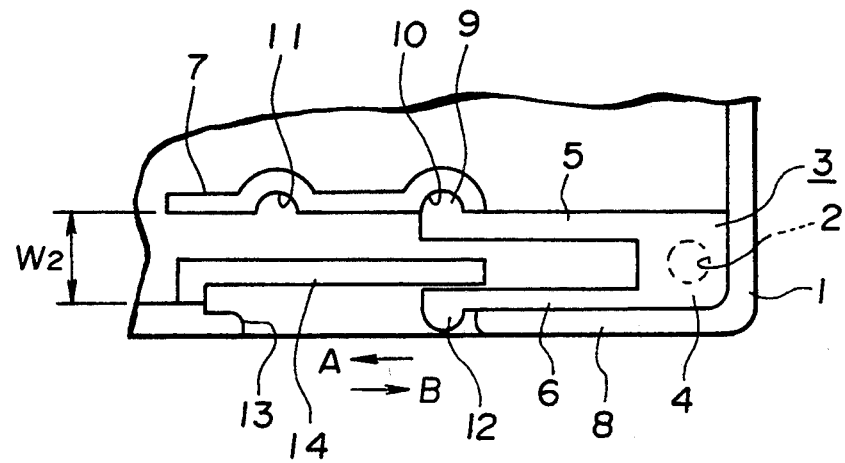
FIG. 2 is a partial plan view showing the conventional mistaken recording inhibiting mechanism shown in FIG. 1, with the mistaken recording inhibiting member closing the mistaken recording detecting hole.
Figure 3:
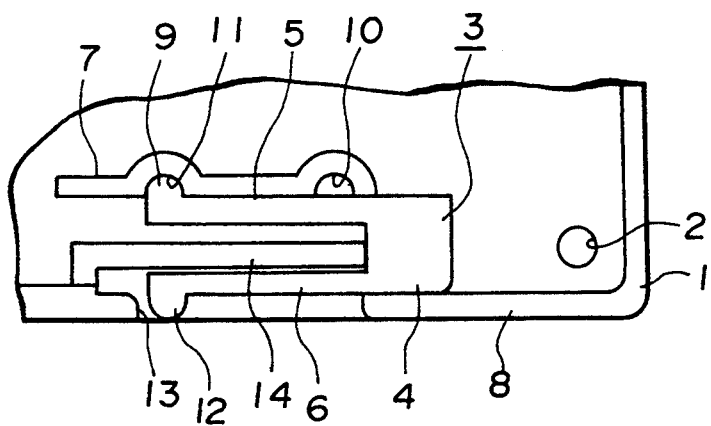
FIG. 3 is a partial plan view showing the conventional mistaken recording inhibiting mechanism shown in FIG. 1, with the mistaken recording inhibiting member leaving open the mistaken recording detecting hole.

Referring to the drawings, the mistaken recording inhibiting mechanism for a disc cartridge according to a first embodiment of the present invention will be explained.

The disc cartridge, to which the present invention is applied, accommodates a magneto-optical disc 21 which permits erasure of an information signal recorded thereon and re-recording of new information signals. The disc cartridge includes a cartridge main body 24 formed by assembling a rectangular upper half 22 and a rectangular lower half 23 which connect in a position adjacent to each other. The magneto-optical disc 21 is rotatably accommodated within the cartridge main body 24.

Figure 4:
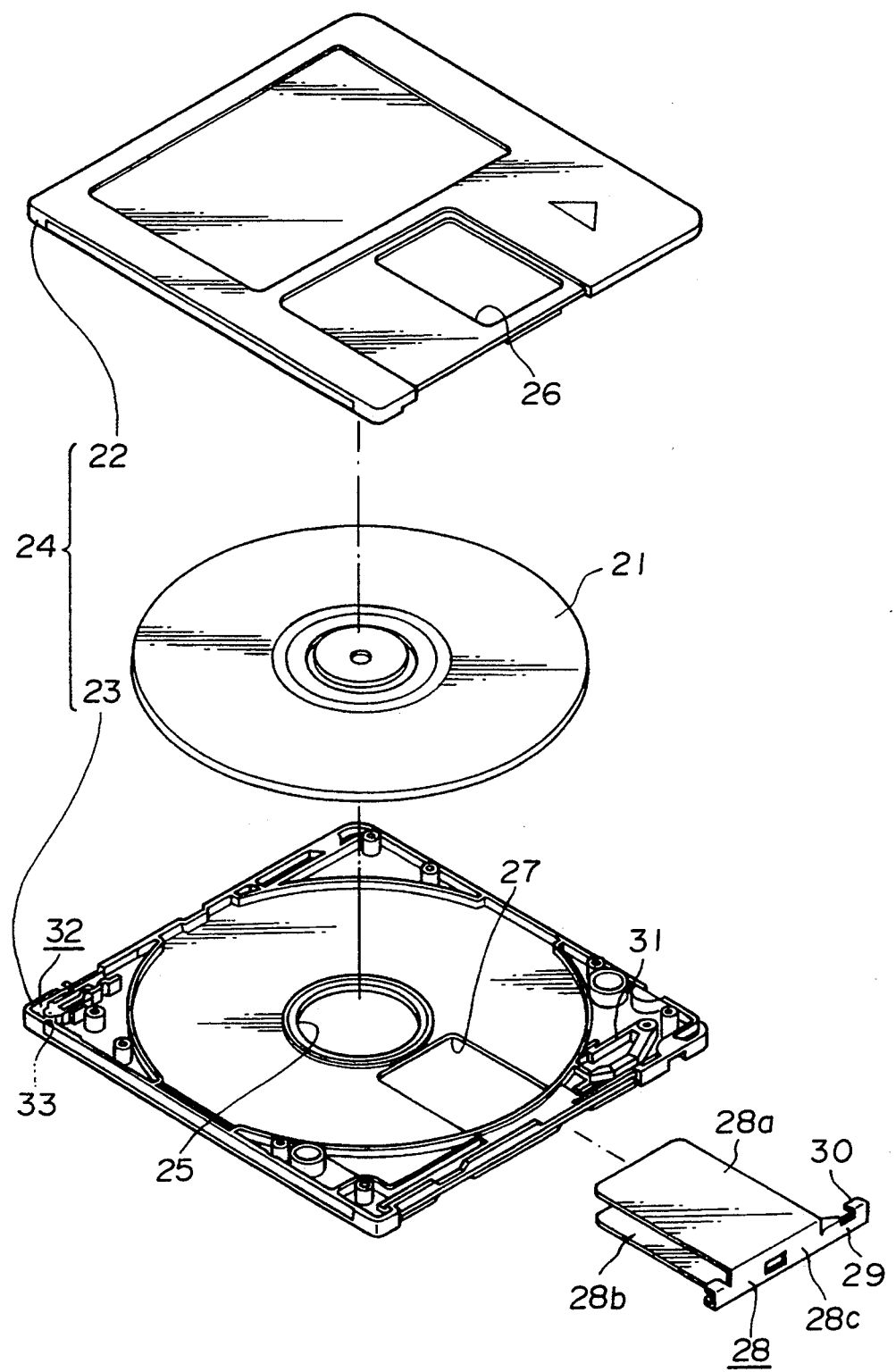
FIG. 4 is an exploded perspective view of a disc cartridge to which the mistaken recording inhibiting mechanism according to a first embodiment of the present invention is applied.

The cartridge main body 24 is formed with a disc entrance aperture 25 which allows access by a disc table of a disc rotating and driving device adapted for rotationally driving the magneto-optical disc 21 when the disc cartridge is loaded in position within the recording-/reproducing apparatus. Specifically, the disc entrance aperture 25 is a circular opening located in the central portion of the lower half 23, as shown in FIG. 4, to permit the inner peripheral region inclusive of a center aperture 21a of the disc 21 accommodated in the cartridge main body 24 to be accessible from the outside. The disc 21 is set on the disc table by the above-mentioned inner peripheral region.

The upper and lower surfaces of the cartridge main body 24, that is the upper half 22 and the lower half 23, are formed with recording/reproducing apertures 26, 27 for exposing to outside the main cartridge body part of the signal recording region of the disc 21 across the inner and outer peripheries of the disc. These recording-/reproducing apertures 26, 27 are rectangular in profile and positioned in the middle portion in the transverse direction of the cartridge main body 24 and extend from a position proximate to the disc entrance aperture 25 to the front surface 24a of the cartridge main body 24, as shown in FIG. 4.

Furthermore, the cartridge main body 24 is provided with a shutter member 28 adapted for closing the recording/reproducing apertures 26, 27 in order to prevent impurities from intruding into the cartridge main body 24 via the recording/reproducing apertures 26, 27 and depositing on the magneto-optical disc 21 accommodated therein. The shutter member 28 is formed by punching and bending a thin metal sheet into the shape of a U-shaped cross-section. The shutter member 28 is made up of shutter plates 28a, 28b for closing the recording/reproducing apertures 26, 27 and a connecting web 28c connected to the proximal ends of the shutter plates 28a, 28b The connecting web 28c is extended at one side thereof by a slide guide 29 to permit parallel movement of the shutter member 28 along a front side 24a of the cartridge main body 24.

Figure 5:
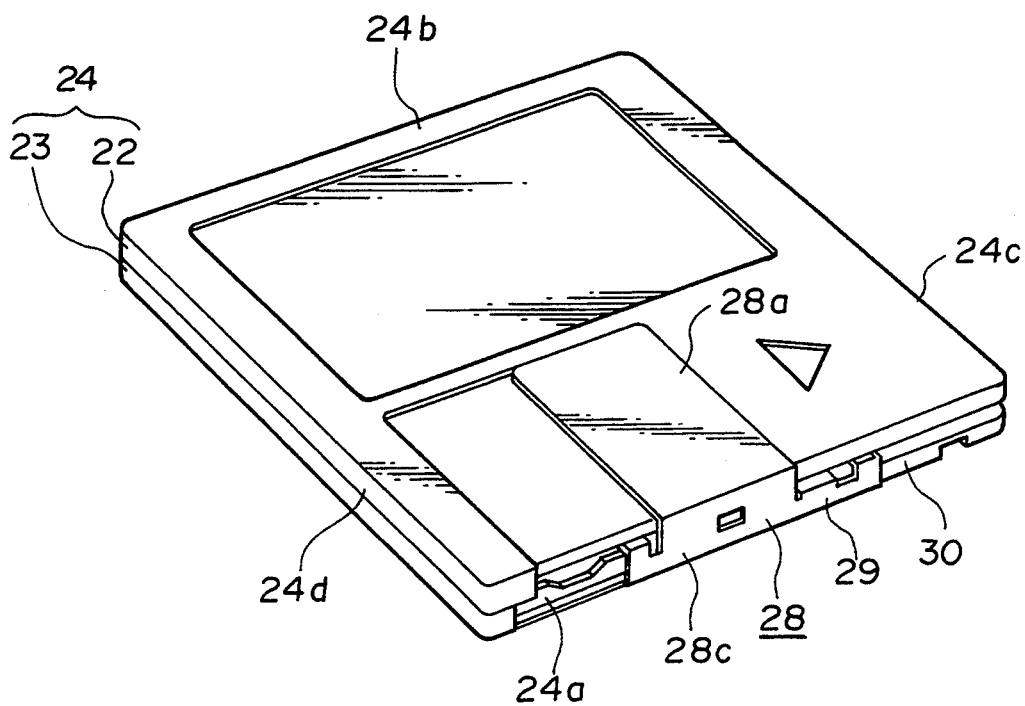
FIG. 5 is a perspective view of the disc cartridge shown in FIG. 4, as seen from the front side fitted with the shutter member of the disc cartridge shown in FIG. 4.

The shutter member 28 is fitted on the front side of the cartridge main body 24, with the shutter plates 28a, 28b overlying the recording/reproducing apertures 26, 27. The shutter member 28 is movably constrained to the cartridge body 24 so that it can be moved by sliding between the position of closing the recording/reproducing apertures 26, 27 and the position of opening the apertures. The shutter member 28 shown by solid lines in FIGS. 5 and 6 is in the position such that the recording/reproducing apertures are closed.

At a corner of the front side of the lower half 3 constituting the cartridge main body 24, a shutter locking member 31 is adapted for being engaged with a mating engaging piece 30. Mating engaging piece 30 is formed by partially bending the slide guide 29 and holds the shutter member 28 in the closure position. Shutter locking member 31 is mounted as shown in FIG. 4 for preventing the shutter member 28 from being inadvertently moved from the position of closing he recording/reproducing apertures 26, 27 shown in FIGS. 5 and 6, to the position opening the apertures 26, 27.

At a corner of a rear side 24b of the cartridge main body 24, diametrally opposite to the corner of the front side 24a fitted with the shutter locking member 31, a mistaken recording inhibiting member 32 is provided, as shown in FIG. 4. This mistaken recording inhibiting member 32 is provided on the lower half 23. A detecting hole 33, adapted for being opened and closed by the mistaken recording inhibiting member 32, is formed at the corner of the rear side 24b fitted with the mistaken recording inhibiting member 32. That is, the detecting hole 33 is bored in the lower major surface at the above-mentioned corner of the rear side 24b of the cartridge main body 24, as shown in FIG. 6.

Figure 6:
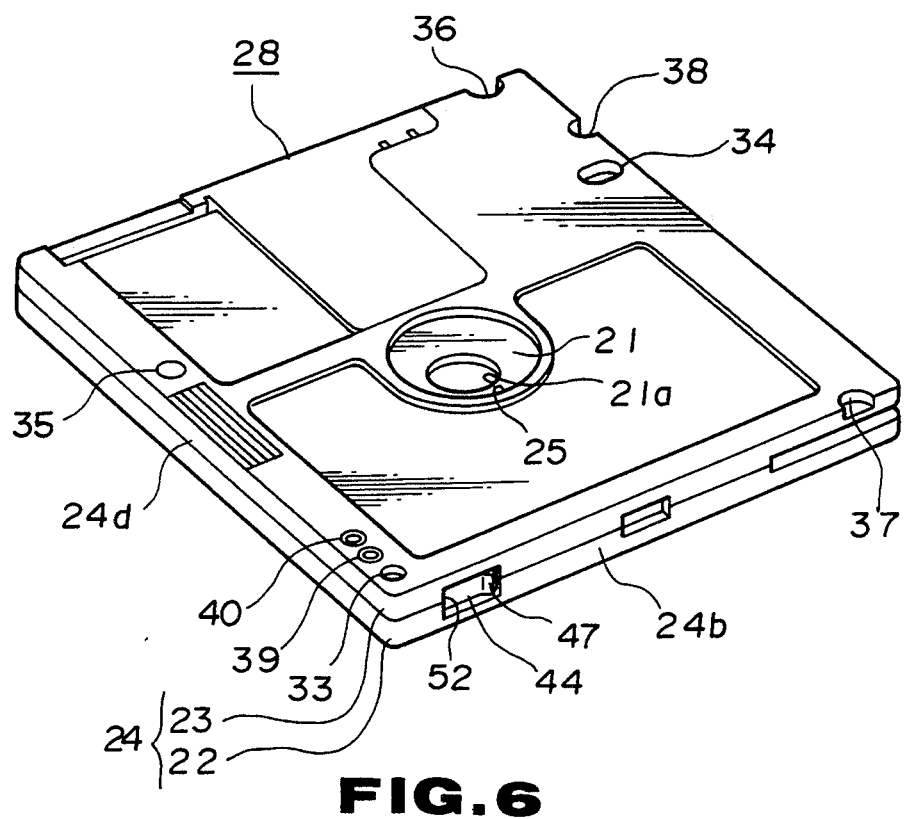
FIG. 6 is a perspective view of the disc cartridge shown in FIG. 4, as seen from the rear side.

Referring to FIG. 6, the lower major surface of the cartridge main body 24 provided with the detecting hole 33 has pin-engaging holes 34, 35 adapted for being engaged by positioning pins, not shown, adapted for setting the loading position of the disc cartridge on loading the disc cartridge in a cartridge loading section within the recording/reproducing apparatus. The lower major surface of the cartridge main body 24 is formed with engaging recesses 36, 37 adapted for being engaged by a cartridge holding pawl, not shown, of an automatic loading mechanism used for automatically loading the disc cartridge on the cartridge loading unit within the recording/reproducing apparatus. These engaging recesses 36, 37 disposed respectively on the front side 24a and the rear side 24b and are situated proximate to a lateral side 24c. Lateral side 24c is used as an inserting end when the disc is loaded into a cartridge loading unit.

The lower major surface of the cartridge main body 24 is also formed with an indicating recess 38 for indicating that the disc accommodated within the cartridge main body 24 is the magneto-optical disc 21, as shown in FIG. 6. The indicating recess 38 is formed at a position on the lateral side 24c proximate to the front side 24a.

The lower major surface of the cartridge main body 24 is formed with disc type discriminating holes 39, 40 for signifying the type of the disc accommodated within the cartridge main body 24, as shown in FIG. 6. These holes 39, 40 are situated towards a lateral side 24d opposite to the lateral side 24c in alignment with the detecting hole 33.

Figure 7:
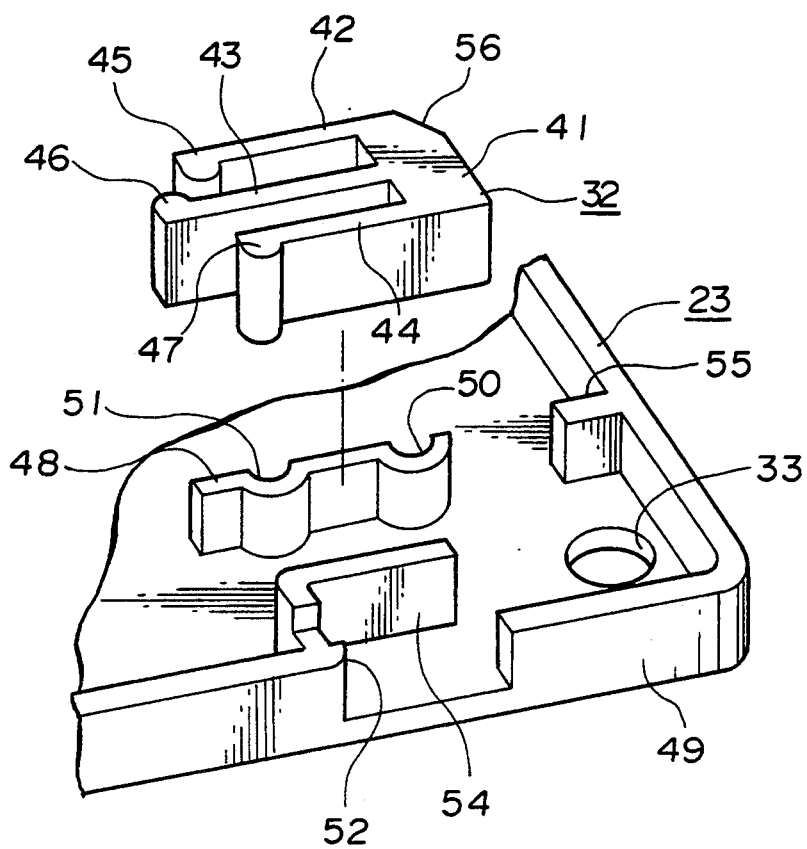
FIG. 7 is an exploded perspective view showing the state in which the mistaken recording inhibiting member is retained by the lower half of the cartridge main body.

The mistaken recording inhibiting member 32, provided within the cartridge main body 24, is molded from synthetic resin, and has a substantially square-shaped closure web 41 at a proximal side which has an area at least as large as that of the detecting hole 33, as shown in FIG. 7. Extended from the one end face of the closure web 41 are a pair of resiliently deflectable resilient arms 42, 43 arranged side by side and a movement actuating arm 44, arranged substantially parallel to these resilient arms 42, 43.

The resilient arms 42, 43 are of different lengths such that the resilient arm 43 is longer in length than the resilient arm 42. Retention beads 45, 46 are formed at the distal ends of the resilient arms 42, 43 respectively and extend towards each other, as shown in FIG. 7. Because the retention beads 45, 46 are at the distal ends of resilient arms 42, 43 of the different lengths, these retention beads 45, 46 may be engaged with each other so as to not contact each other in a way which would cause the resilient arms 42, 43 to deflect.

A movement actuating bead 47 is also formed at the distal end of the movement actuating arm 44 and extends outwardly, that is in a direction away from the resilient arms 42, 43.

On the inner major surface of the lower half 23 of the cartridge main body 24 provided with the mistaken recording inhibiting member 32, is disposed an upstanding slide guide 48 adapted for guiding the resilient arms 42, 43 of the mistaken recording inhibiting member 32 during movement thereof and also adapted for being clamped by the resilient arms 42, 43, as shown in FIG. 7. The slide guide 48 is formed parallel to an upstanding peripheral wall 49 on the lower half 23 which is used as a wall surface of the rear side 24b of the cartridge main body 24.

The slide guide 48 is formed with first and second engaging recesses 50, 51 to be engaged by the retention bead 45 at the distal end of the resilient arm 42. These first and second engaging recesses 50, 51 are formed by arcurately bending part of the slide guide 48. The first and second recesses 50, 51 are respectively located so that they will be engaged by the retention bead 45 when the mistaken recording inhibiting member 32 is in the positions of closing and opening the detecting hole 33.

The rear side 24b of the cartridge main body 24 is formed with a notch 52 to prevent interference with the movement actuating bead 47 of the movement actuating arm 44. The notch 52 is formed by partially cutting the upstanding peripheral wall sections 49 of the upper and lower halves 22, 23 making up the wall of the rear side 24b of the cartridge main body 24. The notch 52 is of a sufficient width to permit the mistaken recording inhibiting member 32 to be moved between the position of closing the detecting hole 33 and the position of opening the detecting hole 33.

A barrier wall 54 is formed within the lower half 23 and faces the notch 52. The barrier wall 54 limits the resilent deflection of the movement actuating arm 44 towards the inside of the cartridge main body 24, and prevents viewing of the inside of the cartridge main body 24 by blocking the view through notch 52.

Figure 8:
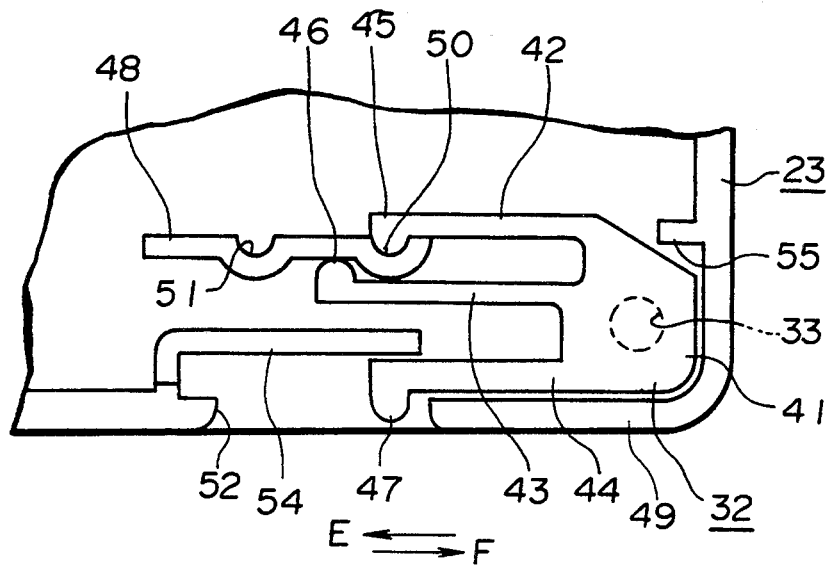
FIG. 8 is a partial plan view showing the state in which the mistaken recording inhibiting member is retained by the lower half of the cartridge main body when the mistaken recording detecting hole is closed.

The mistaken recording inhibiting member 32 is situated on the inner surface of the lower half 23, as shown in FIG. 8, with the closure web 41 lying towards the detecting hole 33 and with the resilient arms 42, 43 clamping the slide guide 48, the movement actuating arm 44 being extended between the upstanding peripheral wall 49 and the barrier wall 54.

Since the mistaken recording inhibiting member 32, thus provided within the lower half 23, holds the slide guide 48 by the resilient arms 42, 43, it is better constrained by the lower half 23 and less readily detached therefrom. With the mistaken recording inhibiting member 32 thus arranged on the lower half 23, the mistaken recording inhibiting member 32 is exposed to the outside of the cartridge main body 24 via notch 52.

With the mistaken recording inhibiting member 32 thus held by the lower half 23 and arranged within the cartridge main body 24, the movement actuating bead 47 may be accessed through notch 52 and acted upon for sliding the mistaken recording inhibiting member 32 in the direction shown by arrow E and arrow F in FIG. 8, with the resilient arms 42, 43 being then guided by the slide guide 48.

When the closure web 41 is in the position of closing the detecting hole 33, the retention bead 45 Formed at the distal end of the resilient arm 42 is engaged in the engaging recess 50 formed in the slide guide 48, as shown in FIG. 8.

With the detecting hole 33 thus closed by the closure web 32, mistaken recording detection means (not shown) provided in the recording/reproducing apparatus will detect this condition and will permit information signal to be recorded on the magneto-optical disc 21 accommodated within the cartridge main body 24.

When the mistaken recording inhibiting member 32 is slid in the direction shown by arrow E in FIG. 8 until the closure web 41 reaches the position of opening the detecting hole 33, the retention bead 45 formed at the distal end of the resilient arm 42 is engaged in the second engaging recess 51 formed in the slide guide 48. This engagement maintains the detecting hole 33 in the opened state.

With the detecting hole 33 thus opened by the mistaken recording inhibiting member 32, the detecting hole 33 is detected by mistaken recording detecting means provided in the recording/reproducing apparatus to inhibit recording of information signals on the magneto-optical disc 21 accommodated in the cartridge main body 24.

Figure 9:
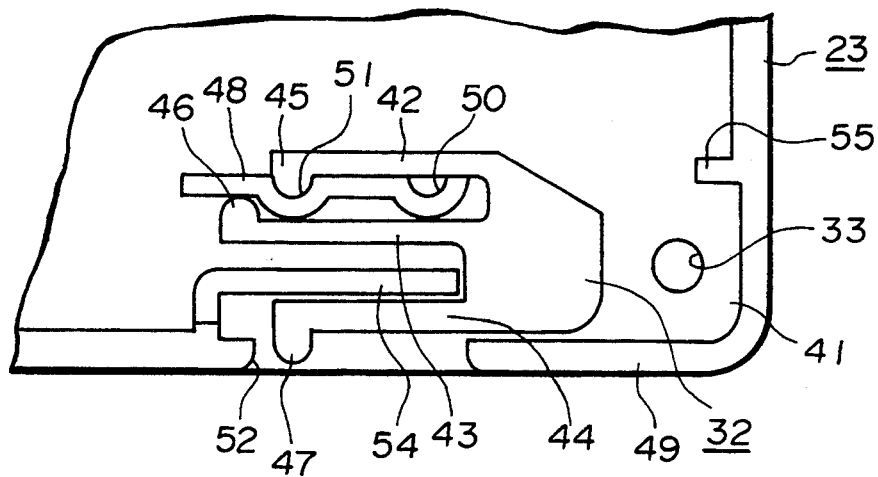
FIG. 9 is a partial plan view showing a lower half and showing the state in which the mistaken recording inhibiting member is moved to a position of opening the mistaken recording detecting hole.

When the mistaken recording inhibiting member 32 is moved in the direction of opening the detecting hole 33, the retention bead 46 formed at the distal end of the resilient arm 43 rides over the second engaging recess 51. When the mistaken recording inhibiting member 32 reaches the position of opening the detecting hole 33, it becomes engaged with the slide guide 48. Thus the mistaken recording inhibiting member 32 is constrained in its movement to the direction shown by arrow F in FIG. 9 and reliably maintains the detecting hole 33 in the opened position.

Meanwhile, the lower half 23 is provided with a guide lug 55 for positively guiding the mistaken recording inhibiting member 32 direction of closing the detecting hole 33 when the mistaken recording inhibiting member 32 is moved in the direction of closing the detecting hole 33 as shown by arrow F in FIG. 8. An inclined guide surface 56, shown in FIG. 7, adapted to be guided by the guide lug 55 is formed on the mistaken recording inhibiting member 32 by chamfering the corner of the closure web 41.

Figure 10:
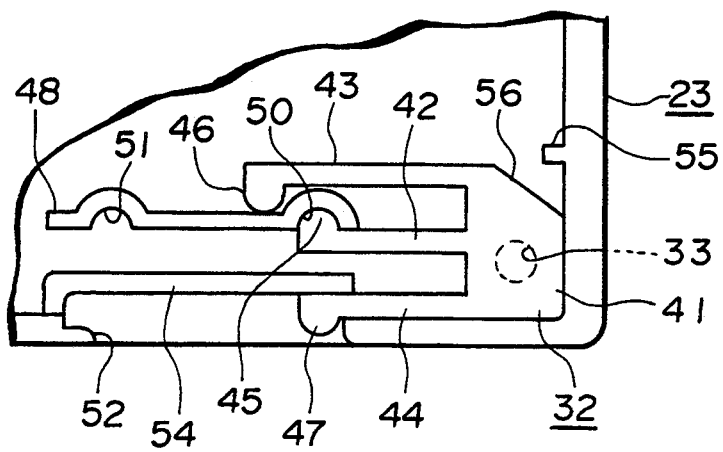
FIG. 10 is a partial plan view showing a second embodiment of the mistaken recording inhibiting mechanism for a disc cartridge according to the present invention.

Although the resilient arm 42 having the retention bead 45 adapted for being engaged by the first and second engaging recesses 50, 51 formed in the slide guide 48 is provided on the outer side in the above-described first embodiment, the relative disposition of the resilient arms 42, 43 may be reversed, by way of a second embodiment, as shown in FIG. 10. In such case, the first and second guide recesses 50, 51 are formed in the slide guide 48 in the opposite surface with respect to the first embodiment.

Figure 11:
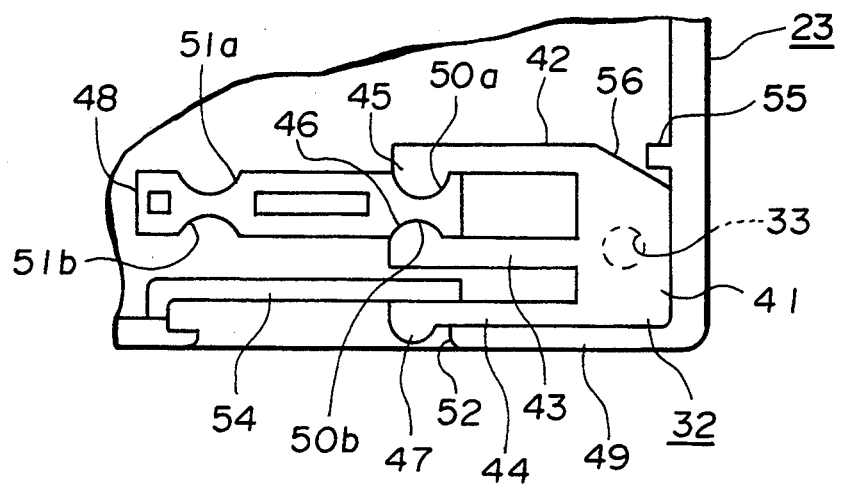
FIG. 11 is a partial plan view showing a third embodiment of the mistaken recording inhibiting mechanism for a disc cartridge according to the present invention.

In the above-described embodiments, the slide guide 48 is partially extended arcurately for defining the first and second engaging recesses 50, 51, while the resilient arms 42, 43 are of different lengths so that only the retention bead 45 formed at the distal end of the resilient arm 42 is engaged in the first and second engaging recesses 50, 51. In a third embodiment, shown in FIG. 11, the slide guide 48 is formed on its both sides with grooves 50a, 50b, 51a, 51b for performing the function of the first and second engaging recesses 50, 51. In this case, the resilient arms 42, 43 are of the same length. By forming the resilient arms 42, 43 and the first and second engaging recesses 50, 51 in the above-described manner, the retention beds 45, 46 at the distal ends of the resilient arms 42, 43 are engaged in the first and second engaging recesses 50, 51, so that both the resilient arms 42, 43 play the role of clamping the slide guide 48 and positioning the mistaken recording inhibiting member 32.

The engaging system for relative engagement between the resilient arms 42, 43 holding the mistaken recording inhibiting member 32 in the position of closing the detecting hole 33 and the position of opening the detecting hole 33 may also be reversed from the disposition shown in the above embodiments.

Figure 12:
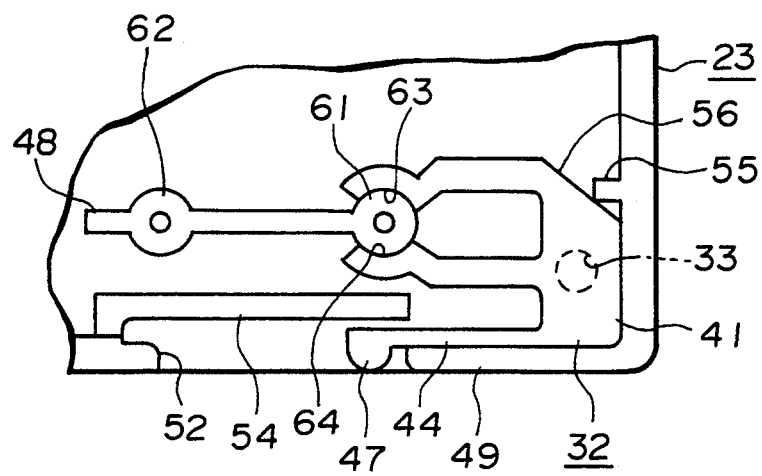
FIG. 12 is a partial plan view showing a fourth embodiment of the mistaken recording inhibiting mechanism for a disc cartridge according to the present invention.

That is, as shown in FIG. 12 as a fourth embodiment, part of the slide guide 48 may be arcuately extended to form first and second protuberant portions 61, 62, while the distal end parts of the resilient arms 42, 43 may be formed with engaging recesses 63, 64 adapted for being mated with the first and second protuberant portions 61, 62 so that the mistaken recording inhibiting member 32 may be maintained in the position of closing or opening the detecting hole 33 by engagement of the first and second extended portions 61, 62 with the engaging recesses 63, 64.

Although the foregoing description has been made with reference to an example of a disc cartridge comprised of the cartridge main body 24 accommodating the magneto-optical disc 21 therein, the present invention may also be applied in general to any disc cartridge accommodating a disc capable of recording information signals.

In the above-described embodiments of the mistaken recording inhibiting system, the movement actuating part of the mistaken recording inhibiting member is acted upon via the notch formed in the lateral surface of the cartridge main body. However, in the above embodiments, since the notch is of a small size, it can be difficult to catch the actuating part of the mistaken recording inhibiting member with a human finger or fingernail to cause the movement of the mistaken recording inhibiting member.

A modification of the present invention which has overcome this inconvenience is hereinafter explained.

Figure 13:
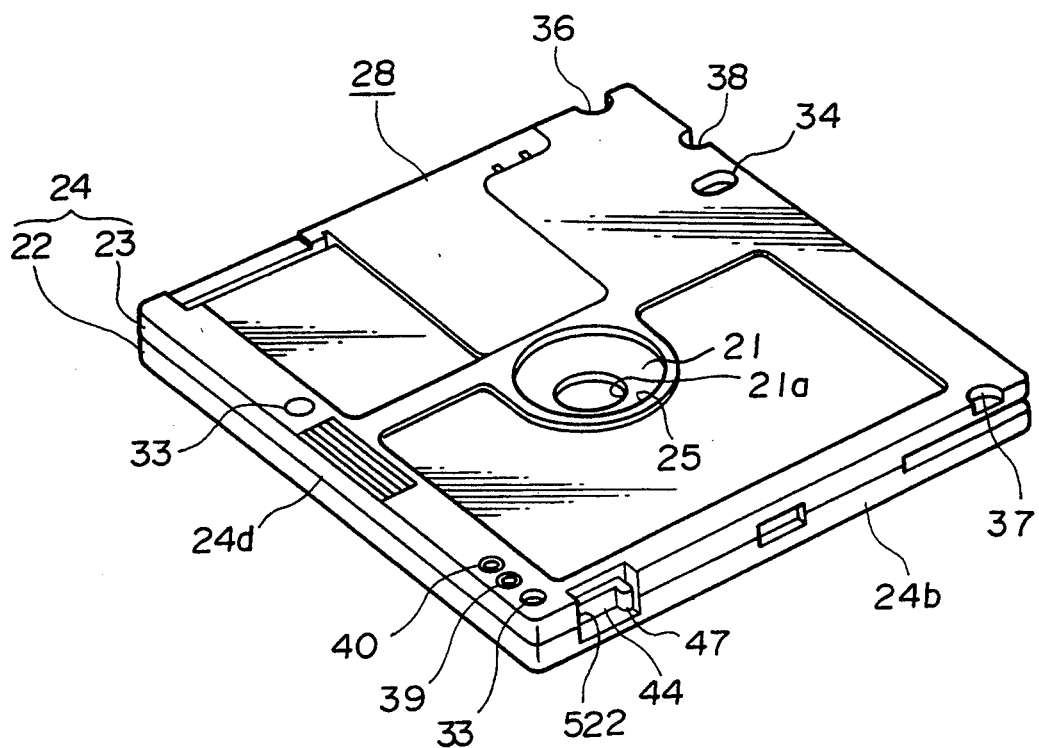
FIG. 13 is a perspective view showing a fifth embodiment of the mistaken recording inhibiting mechanism for a disc cartridge according to the present invention.

FIG. 13 shows a mistaken recording inhibiting system according to a fifth embodiment of the present invention. The parts or components which are used in common with those of the preceding embodiments are indicated by the same numerals and reference is had to the description of the preceding first embodiment. In FIG. 13, 522 is a notch which is formed in the rear side 24b of the cartridge main body 24 and through which a mistaken recording inhibiting member 44 may be acted upon by the finger or nail. The notch 522 extends from the major surface of the lower half 23 to the rear side 24b of the cartridge main body 24. Since the notch 522 may be of a larger size than the notch of the preceding embodiment, the movement actuating arm 44 may be actuated more easily by a human finger or fingernail.

Figure 14:
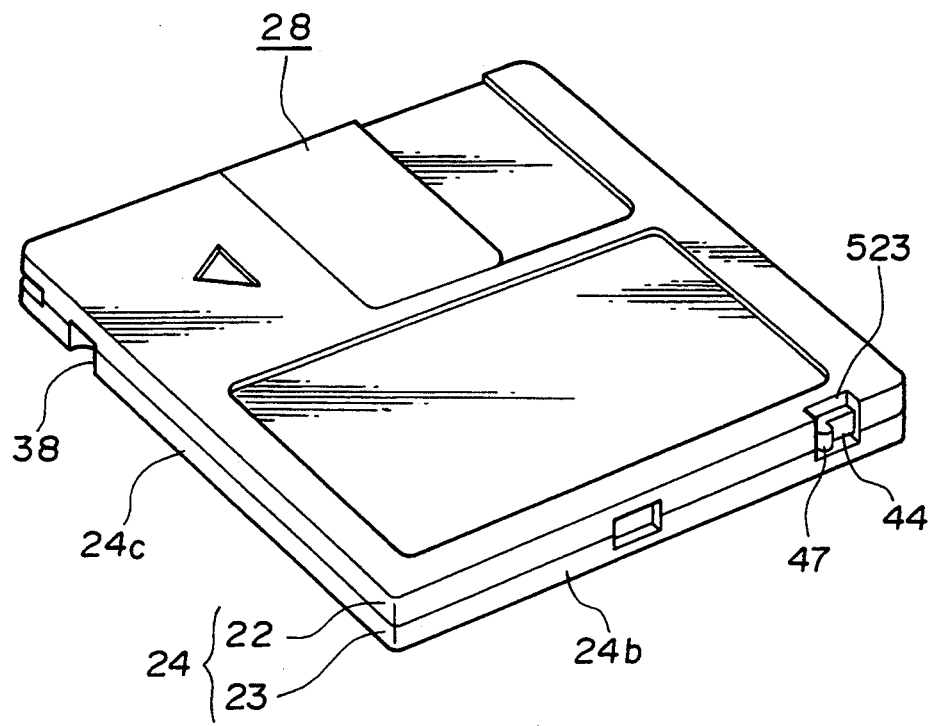
FIG. 14 is a perspective view showing a sixth embodiment of the mistaken recording inhibiting mechanism for a disc cartridge according to the present invention.

FIG. 14 shows a sixth embodiment of the mistaken recording inhibiting member of the disc cartridge according to the present invention, In the present sixth embodiment, parts or components which are used in common with the preceding embodiments are indicated by the same numerals and reference is had to the description of the preceding fourth embodiment.

In FIG. 14, 523 is a notch which is formed in the rear side 24b of the cartridge main body 24 and through which a mistaken recording inhibiting member 44 may be acted upon by the finger or fingernail. The notch 523 extends from the major surface of the upper half 22 to the rear side 24b of the cartridge main body 24. Since the notch 523 may be of a larger size than the notch of the preceding embodiment, the mistaken recording inhibiting member 44 may be actuated more easily as in the preceding fifth embodiment.

In the mistaken recording inhibiting system for the disc cartridge according to a seventh embodiment of the present invention, a notch 117 for acting on a mistaken recording inhibiting member 118 is formed on end surfaces from the end of rear side 24b towards the end of the lateral side 24d of the cartridge main body 24, The notch 117 has a rear side notch section 117b on the rear side 24b and a lateral side notch section 117a on the lateral side 24d. The rear side notch section 117a on the lateral side 24d is of a length which will permit the mistaken recording inhibiting member 118 to be moved between the lateral side position with respect to the detecting hole 33 and the open position of the detecting hole 33, while the rear side notch section 117b on the lateral side 24d is of a length corresponding to the width of the base section 118a which is the main body section of the mistaken recording inhibiting member 118. The supporting piece 110 and the engaging piece 111 are disposed further away from rear side 24b than the lateral notch section 117a of the notch 117, as shown in FIG. 15.

The mistaken recording inhibiting member 118, arranged within the notch 117, has a first engaging extension 118b slidably introduced into a space between the lateral side 24d of the cartridge main body 24 and the supporting piece 110 for sliding in a fore-and-aft direction, while having second and third engaging extensions 118d, 118e engaged with the engaging piece 111. The outer lateral surface of the base part 118a of the mistaken recording inhibiting member 118 is exposed at the lateral notch section 117a of the notch 117 so as to be flush with the lateral side 24d. The rear end face of the base part 118a is exposed at the rear notch section 117b so as to be flush with the rear side 24b when the base section 118a is covering the detecting hole 33. When the base section 118f is covering the detecting hole 33, the outer lateral surface and the rear end face thereof make up a part of the corner of the cartridge main body 24. The outer lateral surface of the base section 118a is provided with a recessed finger rest 118f which can be used to transmit force in a direction parallel to the upper and lower surfaces of the cartridge main body 24.

The above-described mistaken recording inhibiting system of the seventh embodiment operates as follows.

Figure 15:
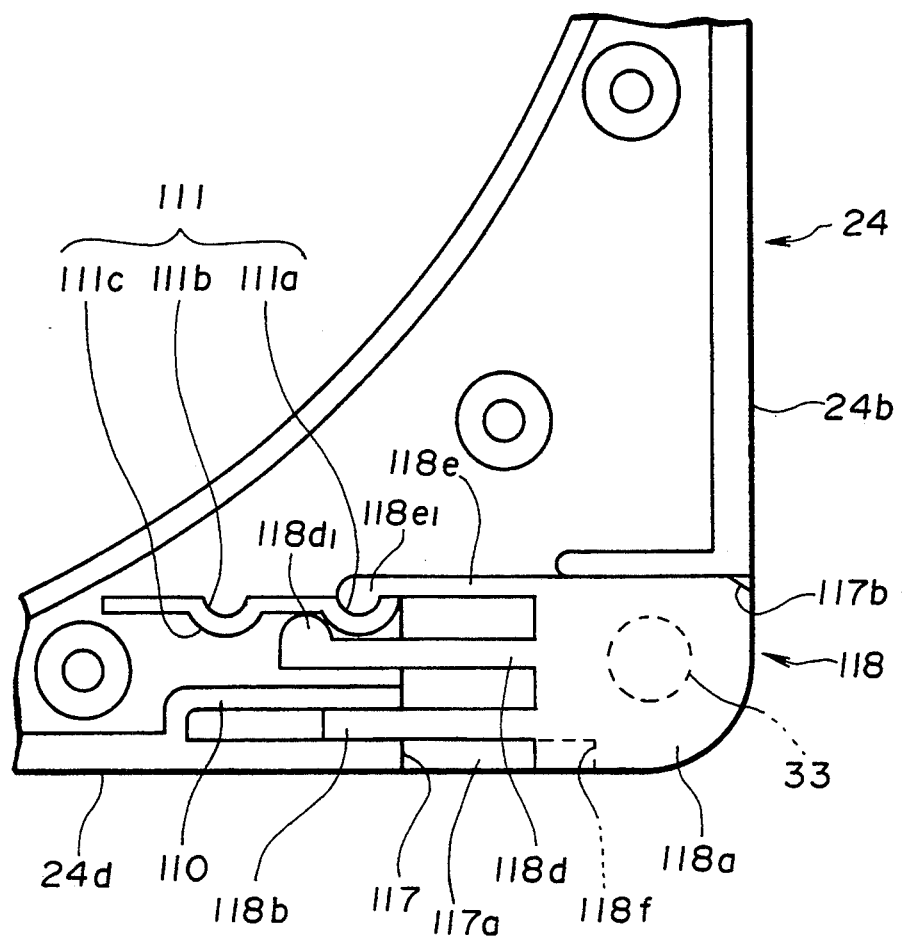
FIG. 15 is an enlarged plan view showing essential parts of a seventh embodiment of the mistaken recording inhibiting mechanism for a disc cartridge according to the present invention.

When recording information signals, the mistaken recording inhibiting member 118 is so arranged that the base section 118a thereof is positioned at a corner of the cartridge main body 24, that is, the rear end face thereof is flush with the rear side 24b with the detecting hole 33 being closed (FIG. 15) . In this position of the mistaken recording inhibiting member 118, the bead 118d' of the second engaging extension 118d is abutted on the outer lateral surface 111c of the engaging piece 111 of the cartridge main body 24, while the bead 118e' of the third engaging extension 118e is engaged in a rear recess 111a of the engaging piece 111, so that the mistaken recording inhibiting member 118 is retained and held with respect to the cartridge main body 24 by the clamping of the engaging piece 111 by the engaging extensions 118d, 118e.

To prevent inadvertent erasure by prohibiting recording, the base section 118a of the mistaken recording inhibiting member is moved by sliding away from rear side 24b of the cartridge main body 24.

In this manner, the mistaken recording inhibiting member 118 is moved so that the first engaging extension 118b is moved further into a space between the supporting piece 110 and the rear side 24b of the cartridge main body 24. The second engaging extension 118d is slid along the outer lateral surface 111c of the engaging piece 111. The third engaging extension 118e is disengaged from the rear recess 111a of the engaging piece 111 and retained by being engaged with a forward recess 111b.

The result is that the base section 118a of the mistaken recording inhibiting member 118 displaced away from the rear side 24b of the cartridge main body 24 into the interior thereof while remaining flush relative to the lateral side 24d of the cartridge main body 24. In this manner, the detecting hole 33 is opened which condition can be detected by the mistaken recording inhibition detecting means of the recording/reproducing apparatus (not shown).

For resetting the cartridge main body 24 from the mistaken recording inhibiting position to the recordable position, the mistaken recording inhibiting member 118 is moved by sliding towards the rear side 24b by applying a force in this direction at the finger rest 118f formed on the outer lateral surface of the base section 118a Since the notch 117 formed in the present seventh embodiment extends along the rear side 24b and the lateral side 24d of the cartridge main body 24 a relatively large are of the mistaken recording inhibiting member 118 is accessible and as a result it becomes easier to introduce forces for sliding the mistaken recording inhibiting member 118. For instance, inhibition of mistaken recording and resetting from the state of inhibition of mistaken recording to the recordable state may be achieved by human finger and fingernails without the necessity of employing a pointed operating tool.

Above all, the mistaken recording inhibiting operation by the mistaken recording inhibiting member 118 may be achieved easily so that the disc cartridge may be set to the mistaken recording inhibiting state easily and positively.

Figure 18:
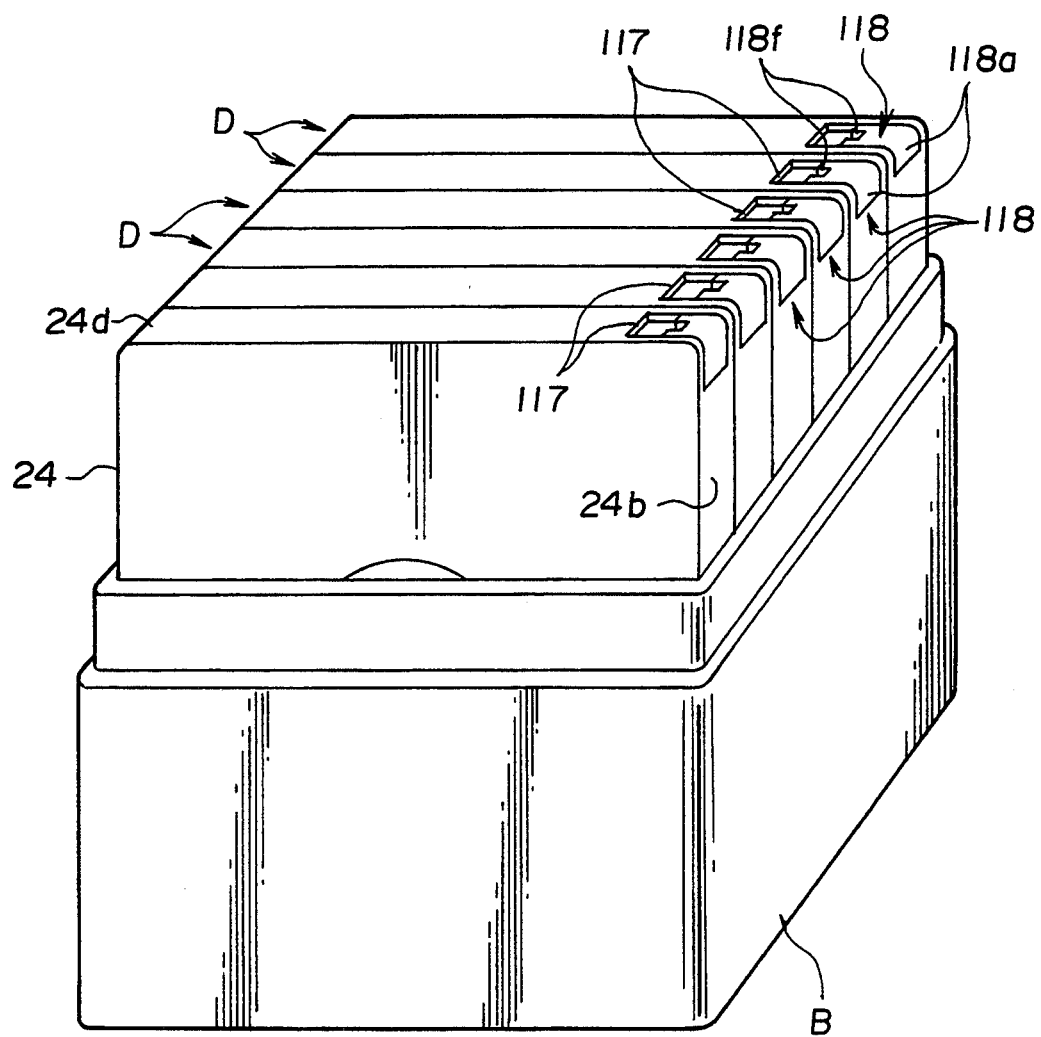
FIG. 18 is a perspective view showing the state in which a plurality of disc cartridges each provided with the mistaken recording inhibiting mechanism are arranged side by side within a cartridge box.

In addition, in the present seventh embodiment, since feasibility of recording/reproduction may be checked depending on whether or not the mistaken recording inhibiting member 118 is receded into the inside of the cartridge main body 24, it is possible to check for feasibility of recording/reproduction of a plurality of disc cartridges placed side by side in a box B as shown in FIG. 18.

Figure 16:
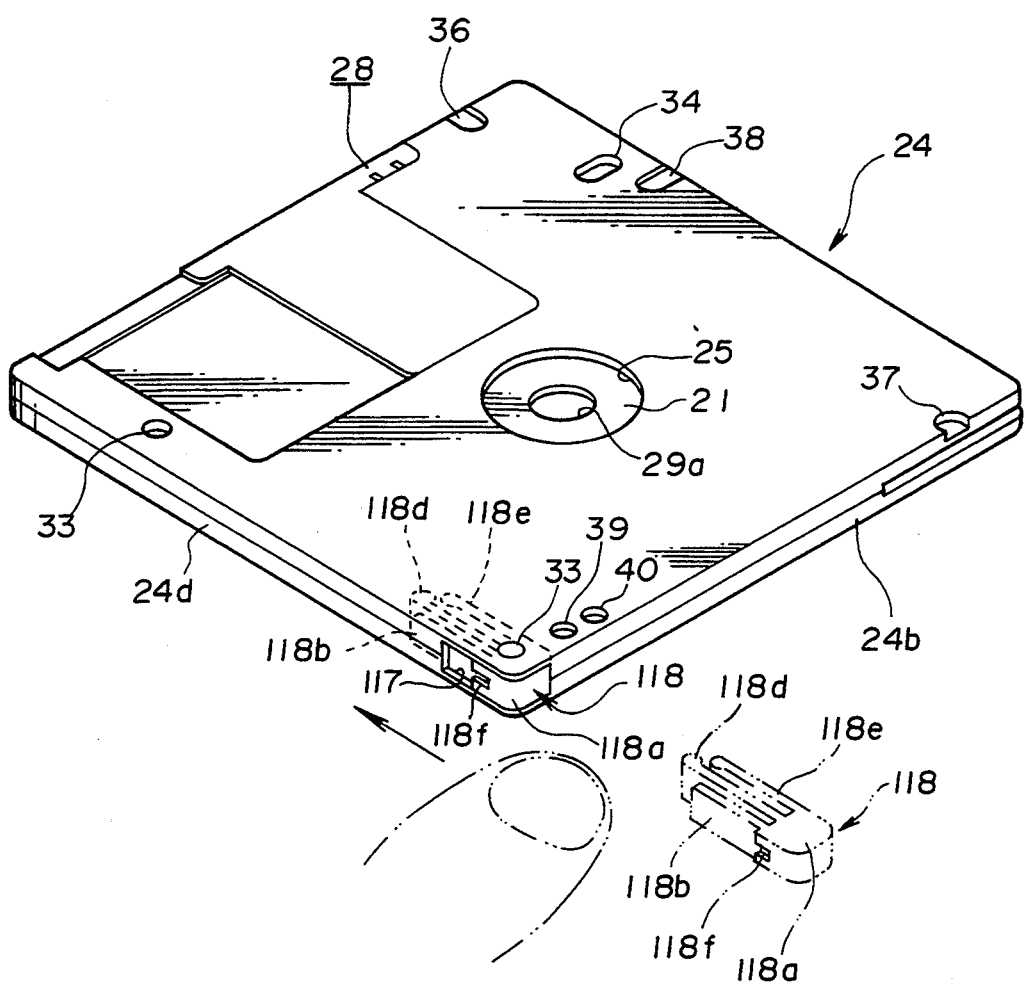
FIG. 16 is a perspective view of the mistaken recording inhibiting mechanism according to a seventh embodiment of the present invention.
Figure 17:
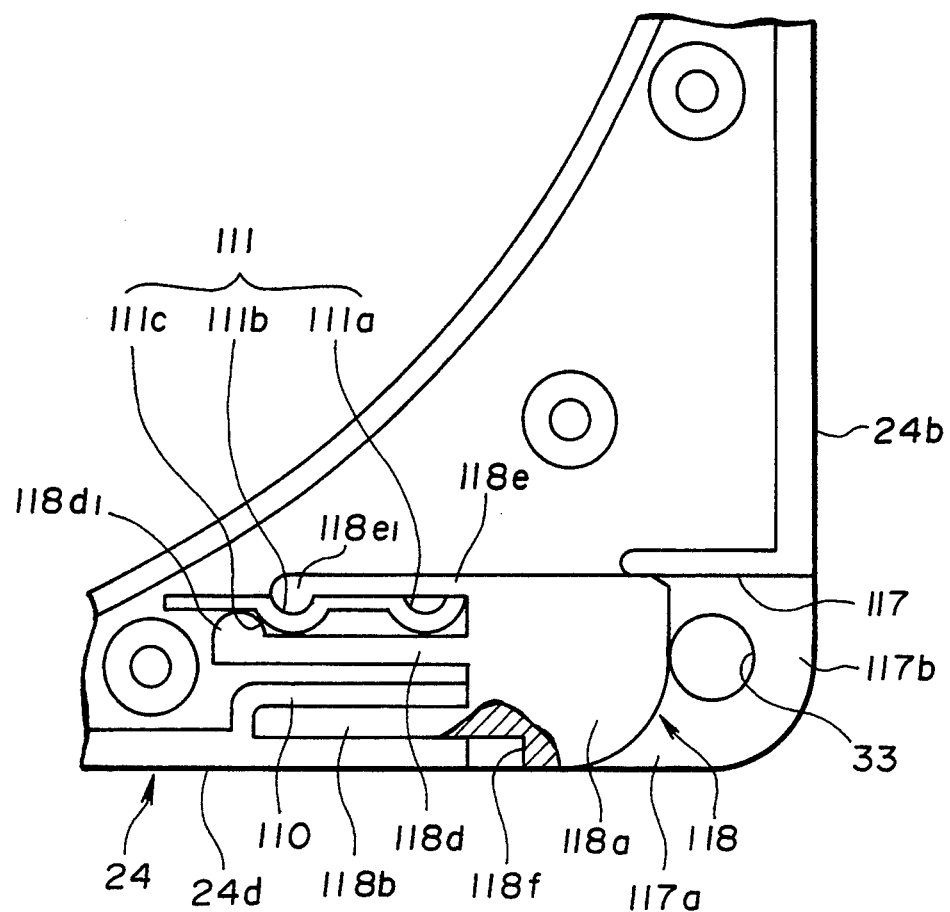
FIG. 17 is an enlarged plan view showing the mistaken erasure inhibiting state in the seventh embodiment shown in FIG. 15.

In the seventh embodiment, a finger rest 118f is formed on the surface of the base section 118a of the mistaken recording inhibiting member 118, as shown in FIG. 16. Alternatively, the lateral end side of the notch section 117a of the notch 117 may be extended further into the lateral side 24d in order to insure a gap into which implements, such as the end of a finger, may be inserted for application of force to the base section 118a of the mistaken recording inhibiting member 118 to facilitate displacement thereof to the open position.

Figure 19:
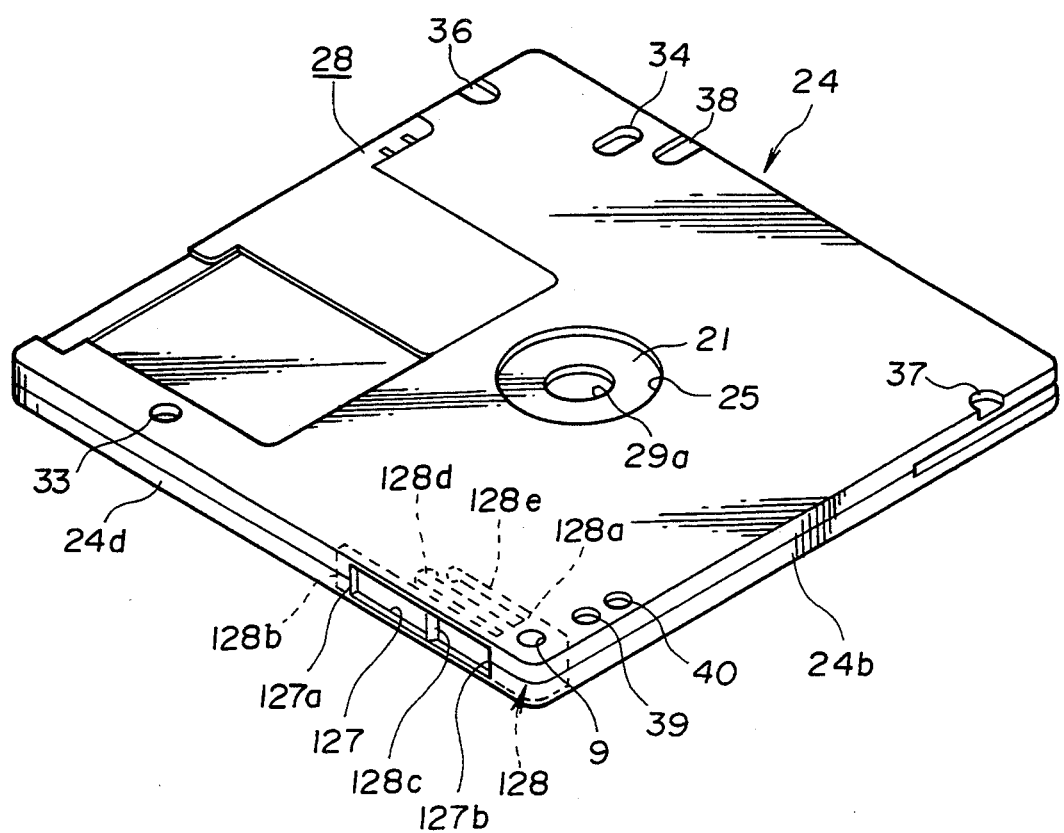
FIG. 19 is a perspective view showing a mistaken recording inhibiting mechanism according to an eighth embodiment of the present invention.

Referring to FIG. 19, an eighth embodiment of the present invention is explained. Parts or components similar to those of the seventh embodiment are indicated by the same numeral and detailed description thereof is omitted.

With the mistaken recording inhibiting system of the disc cartridge of the present eighth embodiment, a notch 127 is formed only in the lateral side 24d of the cartridge main body 24 for extending a longer distance in a direction away from the ejecting hole 33, that is, the notch 127 has a length longer than the notch section 117a of the preceding embodiment.

The mistaken recording inhibiting member 128 associated with the notch 127 is positioned entirely inside the cartridge main body 24. The first engaging extension 128b is adapted to be flush with a lateral surface of the base section 128a and is of a length longer than the second engaging extension, that is of a length long enough to close the notch 127, and a finger rest 128c is formed at a mid part of the outer lateral surface of the first engaging extension 128b. That is, the finger rest 128c is formed on the first engaging extension 128b at such a position that, when the mistaken recording inhibiting member 128 is moved to a position of closing the detecting hole 33, there is some distance between the finger rest 128c and the rear edge 127b of the notch 127. When the mistaken recording inhibiting member 128 is moved to a position of opening the detecting hole 33, there is some distance between the finger rest 128c and the forward edge 127a of the notch 127.

For instance since the notch 127 is formed with a longer length along lateral side 24d, implements, such as a human finger nail, apply force for sliding the mistaken recording inhibiting member 128.

With the above-described mistaken recording inhibiting system for the disc cartridge according to the present invention, since the mistaken recording inhibiting member is moved by guiding resilient arms separated from the movement actuating member by a barrier wall provided in the cartridge main body, stable movement thereby may be achieved.

Besides, since the mistaken recording inhibiting member is arranged within a cartridge main body with the slide guide being clamped by the resilient arms, the mistaken recording inhibiting member may be positively maintained within the cartridge main body without the risk of detachment during and after assembling of the disc cartridge.

In addition, the mistaken recording inhibiting member may be maintained in the positions of opening or closing the mistaken recording detecting hole by engagement with engaging means provided between at least one of the resilient arms and the slide guide, so that the recordable state permitting recording of information signals and the mistaken recording inhibiting state may be established reliably.

Furthermore, since the mistaken recording inhibiting member is arranged within the cartridge main body and designed for clamping the slide guide by the resilient arms which are separated from the movement actuating part, the mistaken recording inhibiting member may be maintained within the cartridge main body, with the slide guide being positively clamped by the resilient arms, even when the mistaken recording inhibiting member is molded from synthetic resin.

Since the mistaken recording detecting hole is formed in the major surface of the cartridge main body and the movement actuating section for actuating the mistaken recording inhibiting member is exposed to the surfaces which are at right angles to the major surface of the cartridge main body, the mistaken recording inhibiting member may be reduced in size and the housing space within the cartridge main body may be diminished so that the present system may be applied advantageously to small-sized disc cartridge.

What is claimed is:

1. A disc cartridge comprising
   a cartridge main body accommodating a disc for rotation therein and having a recording/reproducing aperture for exposing the disc to outside,
   a shutter member movably mounted on one lateral side of said cartridge main body for opening or closing said recording/reproducing aperture, and
   a mistaken recording inhibiting men%her having a closure part of a size large enough to close a detection hole provided in said cartridge main body, first, second and third arms formed as one with said closure part and a movement actuating part for enabling a user of the disc cartridge to move said mistaken recording inhibiting member between a position of opening said detection hole by said closure part and a position of closing said detection hole by said closure part, the movement actuating part being formed on the third arm, said cartridge main body having a slide guide for guiding said mistaken recording inhibiting member in the direction of extension of said resilient arms, said movement actuating part being provided at a position actuatable from outside of said cartridge main body via a notch formed in a lateral side of said cartridge main body, said slide guide being held between said first and second arms.

2. A disc cartridge as defined in claim 1 wherein said disc cartridge has engaging means provided between the first and second resilient arms of said mistaken recording inhibiting member and said slide guide.

3. A disc cartridge as defined in claim 2 wherein said engaging means has an engaging holding part for holding said mistaken recording inhibiting member at a first position of opening the detecting hole in said cartridge main body and a second position of closing said detecting hole.

4. A disc cartridge as defined in claim 3 wherein said engaging holding part has an engaging bead formed in one of said resilient arms or said slide guide and an engaging recess for engagement with said engaging bead.

5. A disc cartridge as defined in claim 1 wherein said notch formed in the lateral side of said cartridge main body is formed for being extended from a major surface to a lateral side of said cartridge main body.

6. A disc cartridge as defined in claim 1 wherein said notch is formed in the lateral side of said cartridge main body which is opposite to the lateral side fitted with said shutter member.

7. A disc cartridge comprising
a cartridge main body accommodating a disc for rotation therein and having a recording/reproducing aperture for exposing the disc to outside,
a shutter member movably mounted on one lateral side of said cartridge main body for opening or closing said recording/reproducing aperture, and
a mistaken recording inhibiting member having a closure part of a size large enough to close a detection hole provided in said cartridge main body, a pair of resilient arms formed as one with said closure part and a movement actuating part which is separate from the resilient arms for actuating the mistaken recording inhibiting member into movement between a position of opening said detection hole by said closure part and a position of closing said detection hole by said closure part, said cartridge main body having a slide guide for guiding said mistaken recording inhibiting member in the direction of extension of said resilient arms, said slide guide being resiliently clasped between said resilient arms and said cartridge main body having a notch via which said movement actuating part may be actuated from outside, said notch being formed in a lateral side of said cartridge main body in a direction along said lateral side and wherein said notch is formed for extending from the lateral side of said cartridge main body to a lateral side thereof at a right angle to the firstly stated lateral side.

8. A disc cartridge as defined in claim 7 wherein said notch is formed on the lateral side of said cartridge main body and has a size large enough to expose the lateral side of said cartridge main body, the lateral side of said closure part of said mistaken recording inhibiting member and said movement actuating part to outside of said cartridge main body.

* * * * *

UNITED STATES PATENT AND TRADEMARK OFFICE
CERTIFICATE OF CORRECTION

PATENT NO. : 5,367,422
DATED : November 22, 1994
INVENTOR(S) : Hirotoshi Fujusawa et al It is certified that error appears in the above-indentified patent and that said Letters Patent is hereby corrected as shown below:

Column 12, line 67, "men%ber" should read --member--.

Signed and Sealed this

Fourteenth Day of February, 1995

Attest:

BRUCE LEHMAN

Attesting Officer    Commissioner of Patents and Trademarks